US 9,401,884 B2

(12) United States Patent
Santhanam et al.

(10) Patent No.: US 9,401,884 B2
(45) Date of Patent: Jul. 26, 2016

(54) CONVERSATION EXPLORER WITH SPLIT NAVIGATION USER INTERFACE

(75) Inventors: Srivatsan Santhanam, Sanjay Nagar (IN); Raghavendra Deshpande, Sahakar Nagar (IN); Saurabh Srivastava, Kalyan Nagar (IN); Muthuraman M, Koramangala (IN); Nakul P. Shenoy, Bangalore (IN)

(73) Assignee: SAP SE, Walldorf (DE)

( * ) Notice: Subject to any disclaimer, the term of this patent is extended or adjusted under 35 U.S.C. 154(b) by 16 days.

(21) Appl. No.: 13/219,388

(22) Filed: Aug. 26, 2011

(65) Prior Publication Data
US 2013/0055144 A1 Feb. 28, 2013

(51) Int. Cl.
*G06F 3/048* (2013.01)
*H04L 12/58* (2006.01)

(52) U.S. Cl.
CPC ..................... *H04L 51/16* (2013.01)

(58) Field of Classification Search
CPC ....................................... G06F 17/30
USPC ....................................... 715/781
See application file for complete search history.

(56) References Cited

U.S. PATENT DOCUMENTS

| | | | | |
|---|---|---|---|---|
| 7,328,242 B1 * | 2/2008 | McCarthy | ............ | G06Q 10/10 709/203 |
| 7,912,904 B2 * | 3/2011 | Buchheit | ............ | G06Q 10/107 709/206 |
| 8,150,924 B2 * | 4/2012 | Buchheit | ............ | G06Q 10/107 709/201 |
| 2005/0222985 A1 * | 10/2005 | Buchheit | ............ | G06Q 10/107 |
| 2005/0223057 A1 * | 10/2005 | Buchheit | ............ | G06Q 10/107 709/203 |
| 2005/0223058 A1 * | 10/2005 | Buchheit | ............ | G06Q 10/107 709/203 |
| 2005/0223066 A1 * | 10/2005 | Buchheit | ............ | G06Q 10/107 709/206 |
| 2005/0262203 A1 * | 11/2005 | Buchheit | ............ | G06Q 10/107 709/206 |
| 2006/0075044 A1 * | 4/2006 | Fox | ............ | G06Q 10/107 709/206 |
| 2007/0047697 A1 * | 3/2007 | Drewry | ............ | H04M 3/42263 379/88.13 |
| 2007/0242656 A1 * | 10/2007 | Klassen | ............ | H04L 12/581 370/352 |
| 2008/0034315 A1 * | 2/2008 | Langoulant | ............ | G06Q 10/109 715/780 |
| 2009/0138828 A1 * | 5/2009 | Schultz | ............ | G06Q 10/10 715/853 |
| 2009/0228264 A1 * | 9/2009 | Williams et al. | ............ | 704/9 |
| 2010/0211889 A1 * | 8/2010 | Durazo | ............ | G06Q 10/107 715/752 |
| 2010/0241749 A1 * | 9/2010 | Rasmussen | ............ | G06Q 10/107 709/226 |
| 2010/0281397 A1 * | 11/2010 | Buchheit | ............ | G06Q 10/107 715/752 |
| 2010/0293242 A1 * | 11/2010 | Buchheit | ............ | G06Q 10/107 709/206 |
| 2011/0016188 A1 * | 1/2011 | Buchheit | ............ | G06Q 10/107 709/206 |
| 2011/0106899 A1 * | 5/2011 | Madnani | ............ | G06Q 10/107 709/206 |
| 2012/0158856 A1 * | 6/2012 | Loofbourrow et al. | ............ | 709/206 |
| 2012/0158857 A1 * | 6/2012 | Loofbourrow | ............ | 709/206 |

* cited by examiner

*Primary Examiner* — William Bashore
*Assistant Examiner* — Henry Orr
(74) *Attorney, Agent, or Firm* — Buckley, Maschoff & Talwalkar LLC (57) ABSTRACT

According to some embodiments, a method and system provides receiving a list of a plurality of conversations, each of the conversations associated with a common set of characteristics and each of the conversations having associated conversation details; presenting at least a portion of the list of the plurality of conversations in a user interface, each of the conversations included in the presented portion of the list being separately represented; receiving a selection of a plurality of the conversations included in the presented portion of the list; and presenting, simultaneously and grouped together in the user interface, conversation details associated with each of the selected plurality of the conversations, separate and apart from the presented portion of the list.

22 Claims, 7 Drawing Sheets

CONVERSATION EXPLORER WITH SPLIT NAVIGATION USER INTERFACE

FIELD

Some embodiments generally relate to a user interface. More specifically, some embodiments provide a method and system for navigating and comparing related conversations in a user interface where a presentation of multiple conversations and details of the conversations are efficiently navigated.

BACKGROUND

An enterprise might store and access business information in a number of different ways. For example, an enterprise might store a substantial amount of information about production, sales, human resources, etc. in one or more database structures created by a business service provider (e.g., SAP AG®). In some cases, a business service provider hosts and provides business services for a client. For example, the business service provider might receive requests from the client and provide responses to the client via a service-oriented architecture such as those provided by SAP Business ByDesign®. In this way, the client may access information via one or more business user interface displays. The use of the remotely hosted business process platform may help the client avoid the costs and problems associated with maintaining a local, "in house" system or systems.

In some instances, an enterprise might want to let users access information via a web display that includes a large number of related data items. User displays have previously used horizontal and/or vertical navigation scroll bars and/or page-wise scrolls to navigate through large listings of related data items. However, using such navigation mechanisms are less than ideal, and may in fact be impractical, when the list of related data items to be displayed and analyzed via the user interface stretches beyond that which can be displayed at once in a display pane. Also, the navigation through a listing of related data items configured in a "tree" structure in a user interface may also be unwieldy and cumbersome, especially with a large number of related data items.

Accordingly, a method and mechanism for efficiently displaying and navigating related data items in a user interface may be provided by some embodiments herein.

DETAILED DESCRIPTION

Figure 1:
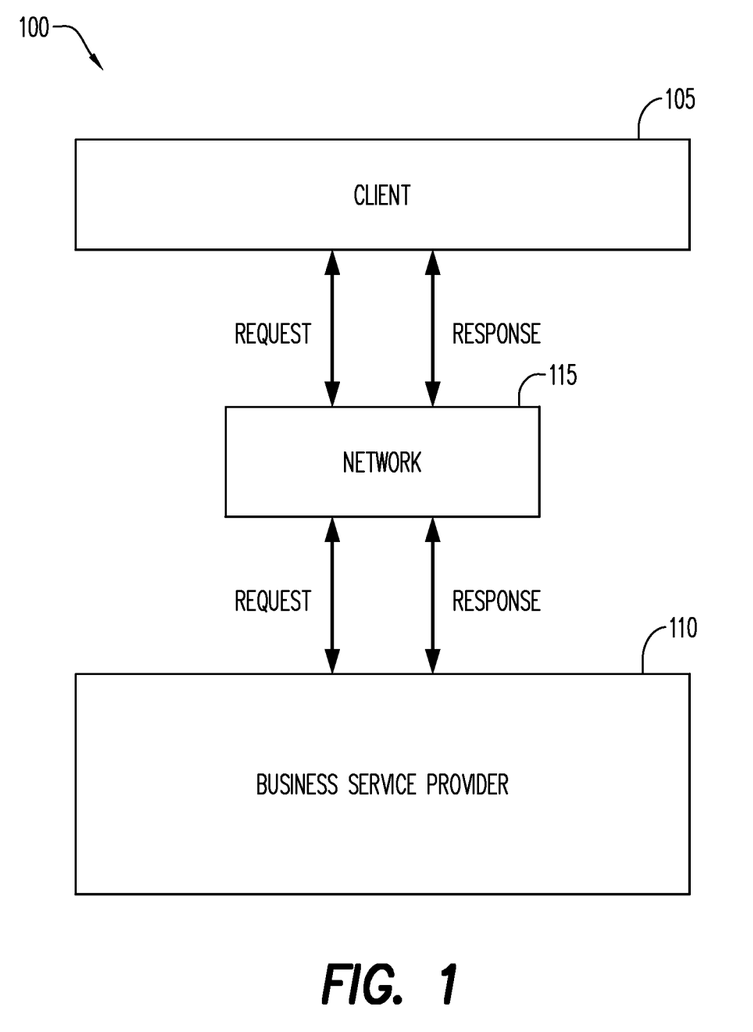
FIG. 1 is a block diagram of a system according to some embodiments.

An enterprise might store and access business information in a number of different ways. For example, an enterprise might store a substantial amount of information about production, sales, human resources, etc. in one or more database structures created by a business service provider (e.g., SAP AG®). FIG. 1 is a block diagram of a system 100 according to some embodiments. In this case, a business service provider 110 might host and provide business services for a client 105. For example, the business service provider 110 might receive requests from client 105 and provide responses to the client 105 via a service-oriented architecture such as those provided by SAP Business ByDesign®. The use of the remotely hosted business process platform may enable client 105 to avoid the costs and resources associated with maintaining a local, "in house" application or system.

Client 105 may be associated with a Web browser to access services provided by business process platform 110 via HyperText Transport Protocol (HTTP) communication, via a smart client, or a mobile client. For example, a user may manipulate a user interface of the client 105 to input an instruction (e.g., "show me a sales report"). Client 105, in response, may transmit a corresponding HTTP service request to business service provider 110 via network 115, as illustrated. A service-oriented architecture may conduct any processing required by the request (e.g., generating views and user interfaces) and, after completing the processing, provides a response to client 105. Client 105 may include a Personal Computer (PC) or mobile device executing a Web client. Examples of a Web client may include, but are not limited to, a Web browser, an execution engine (e.g., JAVA, Flash, Silverlight) to execute associated code in a Web browser, and/or a dedicated standalone application.

FIG. 1 represents a logical architecture for describing processes according to some embodiments, and actual implementations may include more, fewer, or different components arranged in configurations other than that specifically depicted in FIG. 1. In some aspects, each system described herein may be implemented by any number of devices in communication via any number of other public and/or private networks. Two or more of the devices of may be located remote from one another and may communicate with one another via any known manner of network(s) and/or a dedicated connection. In some embodiments, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, one or more types of "discs", magnetic tape, a memory card, a flash drive, a solid state drive, and solid state Random Access Memory (RAM) or Read Only Memory (ROM) storage units. Embodiments are therefore not limited to any specific combination of hardware and software.

A number of "user interfaces" may be developed and/or provided by business service provider 110 (or a third party provider) to facilitate access to business information by client 105. Business service provider 110 may store client information into and retrieve client information from one or more database structures, such one or more "business objects." As used herein, the phrase "business object" may refer to a set of entities with common characteristics and common behavior representing a defined business semantic. Note that business data may be stored within physical tables of a database. The database may comprise a relational database such as SAP MaxDB, Oracle, Microsoft SQL Server, IBM DB2, Teradata and the like. Alternatively, the database could be a multidimensional database, an eXtendable Markup Language (XML) document, or any other structured data storage system. The physical tables may be distributed among several relational databases, dimensional databases, and/or other data sources.

In some aspects, client 105 may interact with database structures hosted by the business service provider 110 via one or more such business user interfaces (e.g., created by the business service provided 110 or by a third party provider (not shown). In some aspects, a single client 105 might be associated with a number of different users. For example, "end users" might represent employees of the client 105 who access information from business service provider 110 as part of their work responsibilities (e.g., to generate sales or to monitor financial information).

In some cases, client 105 might want to let users access certain types of information via a web "conversation explorer" user interface (e.g., a display that presents a plurality of conversations and a means for navigating amongst the presented conversations). As used herein, a conversation refers to a node of information. More particularly, multiple conversations may be related or linked to each other based on each of the conversations being associated with a common set of characteristics. For example, a number of conversations may be related to each other based on each of the conversations being associated with a same, particular business customer. It is noted that the common set of characteristics relating or linking a plurality of conversations to each other may vary depending on the attributes of the plurality of conversations. In some instances, the common set of characteristics may include one or more attributes. The attributes may include, for example and without limitation, a business entity, a business function, a business process, a task, a case, an invoice, a purchase order, a work order, etc. A conversation may encompass one or more types of communication, including for example, a telephone call, a face-to-face meeting, an email, a video conference/call, and other types of electronic messages and personal meetings. In some embodiments, a node of information comprising a conversation may include, for example, information records based on a communication by one person or entity such as, for example, a notebook, journal, log, and other one-party information record.

Figure 2:
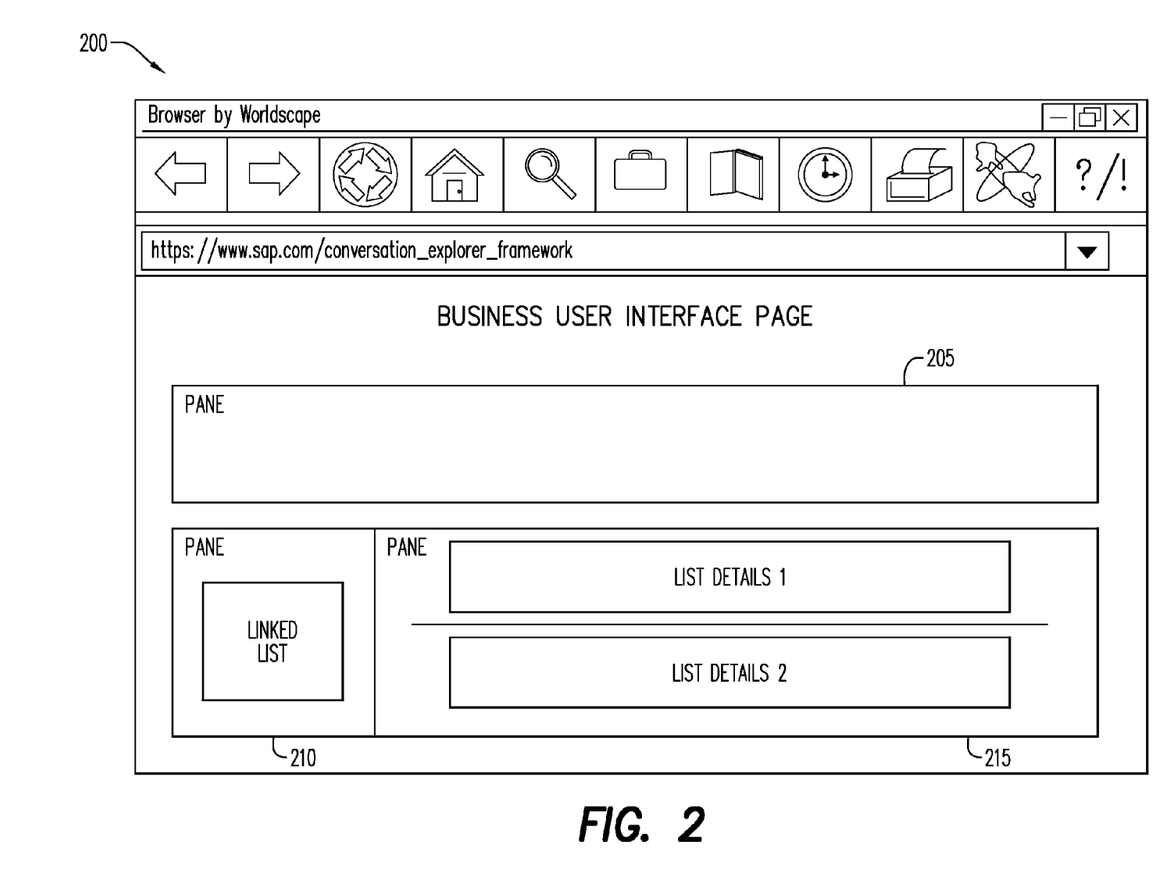
FIG. 2 is an example of a conversation explorer user interface page framework in accordance with some embodiments.

FIG. 2 is an illustration of a conversation explorer user interface 200 in its general structure, in accordance with some embodiments. Conversation explorer user interface 200 provides a logical representation of a conversation explorer user interface page in its general outline, in a simplified view. Conversation explorer user interface 200 might include one or more typical user interface components such as the menu bar, the tool bar, and the URL bar depicted in the upper portion of the conversation explorer user interface. Furthermore, conversation explorer user interface 200 includes a display pane 205, which may include an "inbox". The inbox may include a listing of a plurality of business entities (e.g., a business group, client, partner, etc.) and business functions (e.g., sales, customer support, etc.). Conversation explorer user interface 200 may, according to some embodiments, also include a conversation pane 210 for displaying a linked list of related conversations. The linked list of conversations may be related based on each of the conversations being associated with a common set of characteristics (as will be discussed in greater detail below). According to some embodiments, conversation explorer user interface 200 may also include a conversation details pane 215. As will be discussed in greater detail below, conversation details pane 215 may facilitate displaying details corresponding to multiple conversations included in the linked list of related conversations in conversation pane 210. That is, conversation details pane 215 displays the details for multiple conversations simultaneously (e.g., List Details 1 and List Details 2). In some aspects, the conversation details pane may facilitate contextual decision-making by presenting separated nodes in a display wherein navigation of the conversations may be accomplished efficiently and easily.

In some embodiments, aspects of the conversation explorer user interface 200 may be integrated into business user interface pages. The general configuration of the conversation explorer user interface as represented by the conversation explorer user interface 200 of FIG. 2 may vary in some embodiments. However, certain aspects may be consistently included in a conversation explorer in accordance with embodiments herein such that a plurality of conversations may be efficiently presented and navigated in a user interface.

Figure 3:
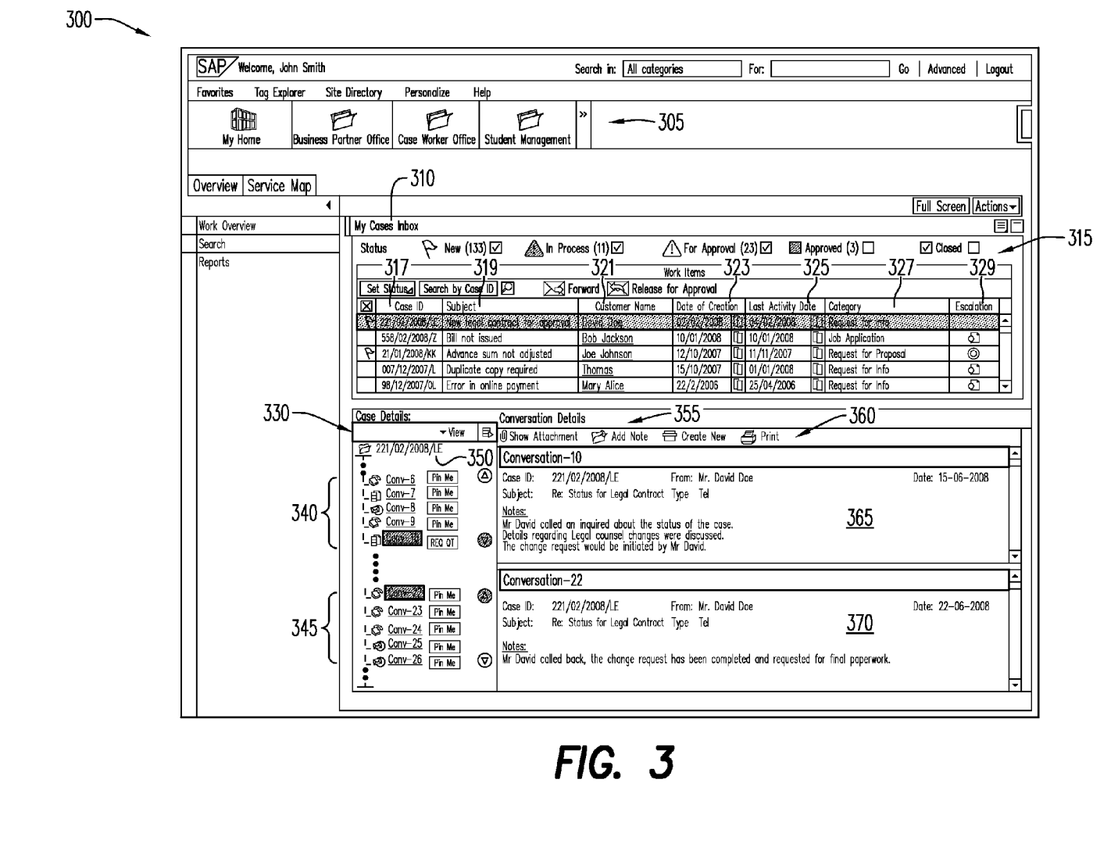
FIG. 3 is an illustration of a conversation explorer user interface page in accordance with some embodiments.

FIG. 3 illustrates a conversation explorer user interface 300 in accordance with some embodiments. Some aspects and components of conversation explorer user interface 300 may be typical of a user interface provided by a business service provider. As such, conversation explorer user interface 300 may, in some aspects, have a "look and feel" similar to a user interface of other user interface pages developed and/or provided by the business service provider. For example, the user greeting in the upper left-hand corner, the main tool bar, and "roles" tool bar 305 may all comply with a general user interface framework of the business service provider 110.

In some embodiments, an inbox 310 includes a listing of "cases" for the user of conversation explorer user interface 300. The cases displayed in inbox 310 may vary depending on the context of the user's "role". In addition to providing a listing of the user's cases in inbox 310, a status bar 315 provides a mechanism for the user to select which type of cases are displayed in the inbox. For example, the user may select to display cases that are "new", "in process", "waiting for approval", and those that are "closed", as shown by the selections made in status bar 315. It is noted that cases of these and other statuses (including those not shown in FIG. 3) may be selectable in some embodiments. For the listing of the cases having a status matching the selected status(es), inbox 310 further includes a case identifier 317 that uniquely identifies each case, a subject 319 descriptive of what the case concerns, a customer name 321 of a person associated with the case, a creation date (323) for the case, a date regarding the last activity in the case (325), a category (327) the case relates to, and an escalation level (329) indicating an importance of the case.

The plurality of cases in inbox 310 may each have a plurality of related conversations associated therewith. In some instances, the number of conversations related to any one case may number in the dozens or even hundreds. Accordingly, it might not be efficient, aesthetically appealing, or practical to provide a complete listing of all of the conversations related to a selected case in inbox 310 (e.g., case "221/02/2008/LE") in case details pane 330. In accordance with embodiments herein, a listing of the conversations related to the selected case in inbox 310 are divided (i.e., split) into two sets of conversations, a first set 340 and a second set 345, and presented for display in case details pane 330. For example, first set 340 may be, in terms of a time/date value associated with the conversations, the first five (5) conversations related to the selected case and second set 345 may be last five (5) conversations related to the selected case. The first and last conversations related to a case may initially and automatically be presented in response to the selection of a case in inbox 310.

In some embodiments, the conversations presented in case details pane 330, including the conversations in the first set 340 and the second set 345, are sequentially ordered based on a date/time value associated with each conversation. The time/date value associated with each conversation may reflect the time and date the conversation occurred. Moreover, the conversations may each have an identifier denoting their ordered relationship with the other related conversations (e.g. Conv 6, Conv 7, Conv 8, . . . ).

In some embodiments, the number of conversations displayed in the first set of conversations 340 and the second set of conversations 345 may be limited to five (5) as shown in the example of FIG. 3. In some embodiments, the value of the number of conversations displayed in case details pane 330 may be a configuration value determined by a user interface designer during a design time development of conversation explorer user interface 300. In some other instances, the value of the number of conversations displayed in case details pane 330 may be set by a user according to their preferences. In some instances, the value of the number of conversations displayed in case details pane 330 may be determined by a combination of design specifications and user preferences.

Each of the first set 340 and the second set 345 of conversations in case details pane 330 may be navigated to move forwards or backwards through the conversations related to the selected case. Moreover, the first set 340 and the second set 345 of conversations in case details pane 330 may be navigated independently of each other. The cases displayed in the first set 340 may be, for example, advanced by navigation of the conversation explorer user interface from displaying conversations 6-10 to displaying conversations 8-12 while the second set 345 continues to display conversations 22-26. In some embodiments, first set 340 can navigate until node (n−1), where n is the first node displayed in second set 345. Similarly, second set 345 may navigate upwards until node n, where n−1 is the last node displayed in the first set 340.

Conversation explorer user interface page 300 further illustrates conversation details pane 355, including tool bar 360. Conversation details pane 355 displays, simultaneously, conversation details relating to multiple conversations. As shown, details relating to conversation 10 and conversation 22 are displayed in details pane 365 and details pane 370, respectively. Conversation details relating to conversations 10 and 22 are displayed in the conversation details panes since conversations 10 and 22 have been selected in case details pane 330. All of the conversation details associated with each selected conversation may be viewed using the navigation controls on the right side of the details pane 365 and details pane 370. The conversation details pane 365 and conversation details pane 370 may each be navigated independently of the other. In some embodiments, the conversation details may be automatically presented in details panes 365, 370 upon selection of the corresponding conversation in case details pane 330.

In some aspects, conversation details may be displayed for two (2) conversations at any one time, as illustrated in FIG. 3. In some other embodiments, conversation details may be displayed for more than two (2) conversations at the same time, all without a need to generate, open, or use a new user interface display pane.

Still referring to FIG. 3, it is noted that presenting the conversation details for multiple conversations grouped together or in close proximity to each other as depicted in conversation details pane 355 may facilitate a user of the conversation explorer user interface in making a business decision. For example, by providing details to multiple conversations displayed in a same user interface pane (e.g. conversations details pane 355), in close proximity to each other and at the same time, the user may be aided in making a contextual decision based on the displayed of the details of the multiple conversations. Also, case details pane 330 provides "context" by showing what conversations occurred before and/or after the selected conversations (e.g., Conv 10 and Conv 22). Thus, the presentation of conversation details for multiple conversations in details panes 365, 370 of the conversation explorer user interface page 300 may provide the user with a broader "view" or insight into the context of the issues of a particular case 350 since the user may simultaneously view the details of multiple conversations, including conversations occurring at different times/dates.

Figure 4:
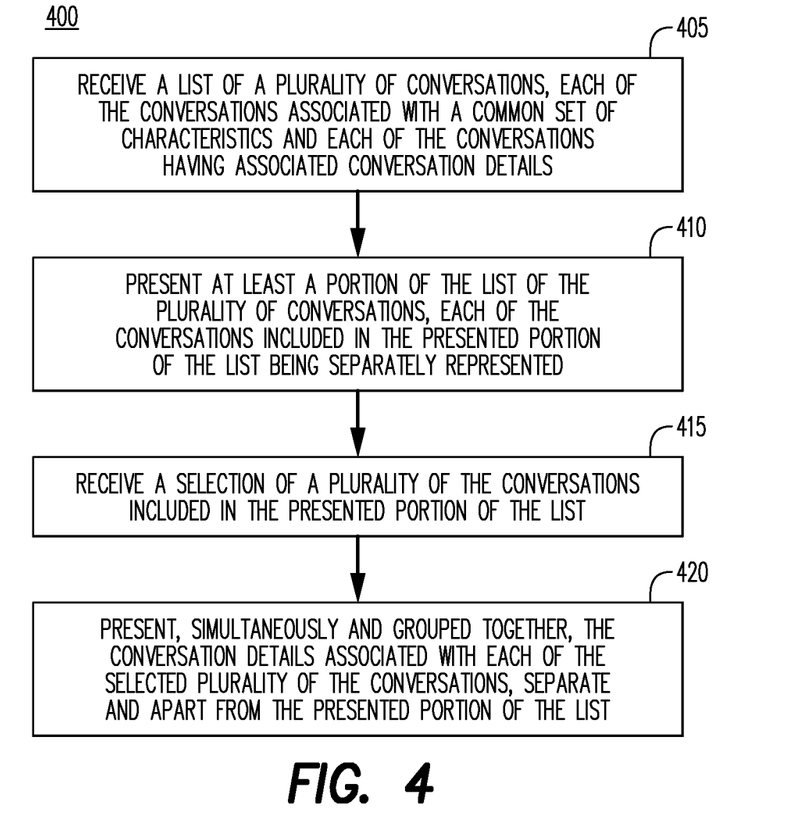
FIG. 4 is a flow diagram of a process according to some embodiments.

FIG. 4 is a flow diagram of a process 400 for providing a conversation explorer user interface in accordance with some embodiments herein. In some embodiments, a conversation explorer user interface (e.g., 300) may be provided to a number of client users (e.g., 105) by a business service provider (110), as illustrated in FIGS. 1 and 3. However, process 400 may be applicable in contexts and operational environments other than that specifically depicted in FIG. 1 and by a conversation explorer configured, in some aspects, differently than the user interface depicted in FIG. 3.

At operation 405, a list of a plurality of conversations is received. The plurality of conversations included in the received list are each related to each other based on some common set of characteristics. The common set of characteristics may include one or more characteristics shared by each of the conversations. For example, each of the conversations in the received list may relate to a particular customer of a business. Further, all of the conversations may relate to a particular project for that particular customer. Thus, in this example the common set of characteristics may include the customer's name and the particular work order for that customer. It is noted however that other, additional, more, fewer, or alternative characteristics may be included in the common set of characteristics, depending on a use-case, user preferences, business considerations, and other factors.

It is further noted that each of the conversations in the list of received conversations may have conversation details associated therewith. The conversation details for each conversation may, in general, at least include an indication of the case, task, or other characteristic or attribute unifying the multiple related conversations; a subject for the conversation; name(s) of the participants in the conversation; a time/date stamp indicating when the conversation occurred; the communication mode or type of the conversation; and a field to contain other data (e.g., notes, etc.), including free form data.

At operation 410, at least a portion of the list of the plurality of conversations received at operation 405 is presented or displayed in a user interface. Whereas there may be no limit on the total number of related conversations received at 405, the number of the received conversations displayed at operation 410 may be limited to a number established by a designer of the conversation explorer user interface based on design considerations and/or a user of the conversation explorer user interface based on personal preferences or use considerations. As illustrated in the case details pane 330 of FIG. 3, a total of ten (10) cases may be presented at any one time therein, where the conversations are split into a first set of five (5) conversations 340 and a second set of five (5) conversations 345. Again, it is noted that the total number of conversations presented for display in the case details pane 330 and the number of conversations included in each set of conversations 340 and 345 may be more or different than those values specifically illustrated in the examples herein, in accordance with some embodiments.

Continuing with process 400, a selection of a plurality of the conversations included in the list of conversations presented in the user interface at operation 410 is received at operation 415. The received selection of conversations may correspond to a user's action to select a number of cases displayed in the user interface. Referring to FIG. 3, the user may select conversation 10 (i.e., "Conv-10") from the first set of conversations 340 and select conversation 22 (i.e., "Conv-22") from the second set of conversations 345, as illustrated by the highlighting of those particular conversations in case details pane 330. In some embodiments, two (2) or more of the conversations may be selected at operation 415, from any of the conversations presented in the cased details pane 330.

At operation 420, case details associated with each of the plurality of conversations selected at operation 415 are presented in the user interface. In particular, the case details associated with the plurality of conversations selected at operation 415 are presented simultaneously and further grouped in close proximity to each other. Accordingly, the details corresponding to multiple conversations may be efficiently and readily viewed, concurrently, by a user. Referring again to FIG. 3, conversation details associated with the selected conversations (e.g., conversations "10" and "22") are displayed in conversation details pane 355 and more particularly details panes 365 and 370. As shown in FIG. 3, each of the specific conversation details panes 365 and 370 have their own navigation controls (e.g., a vertical scroll-bar) so that the full extent of the information contained in the conversations details for each conversation may be fully navigated by the user while only occupying a portion of the user interface's 300 total landscape.

In some embodiments, the process(es) and system(s) herein may be integrated or interfaced with any type of "inbox". For example, a single reusable user interface in accordance with embodiments herein may be implemented in a back-end system of a business service provider that adheres to a model-driven architecture.

In some embodiments, a user may "jump" directly to a specific conversation by specifying a specific conversation. Using a pre-determined key entry (e.g., "F10" key) or sequence of key entries (e.g., "Ctrl"+"J"), a user may navigate directly to (i.e., "jump" to) a specified conversation. For example, a user may enter the pre-determined key entry. The system providing the conversation explorer user interface may receive an indication of a request for a specific one of the plurality of conversations based on the user provided key entry. In reply to the key entry, the user may be prompted to enter an identifier for a specific conversation. For example, if there are 90 conversations related to a particular case and the user wants to navigate to conversation 25, the user may enter the case identifier "25" when prompted for an entry. Upon the entry of "25", the system may receive the selection of the specific one of the plurality of conversations and respond by presenting conversation 25 in the case details pane 300 and the corresponding conversation details in conversations details pane 355, simultaneously and grouped together in the user interface with conversation details of the other selected conversations.

Figure 5:
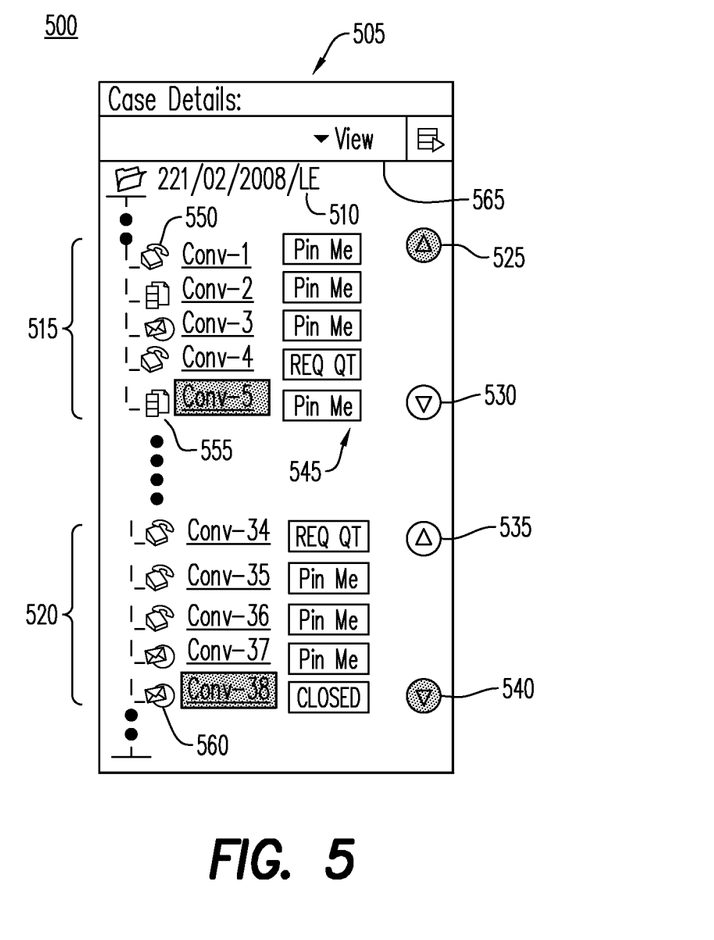
FIG. 5 illustrates a listing of related conversations in a conversation explorer user interface pane according to some embodiments.

FIG. 5 illustrates a detailed view 500 of a listing of related conversations in a conversation explorer user interface pane according to some embodiments. In particular, a case details pane 505 is illustrated. Case details pane 505 may form a part of a conversation explorer user interface, in accordance with some embodiments such as but not limited to the user interfaces depicted in FIGS. 2 and 3. Case details pane 505 includes an indication or representation of the case ID, "221/02/2008/LE", the conversations displayed therein relate to. Further, case details pane 505 includes a first set of conversations 515 and a second set of conversations 520, where navigation controls 525 and 530 provide a mechanism for a user to scroll through the conversations related to the selected case and determine which ones are displayed in the first set 515. Navigation controls 535 and 540 provide a mechanism for a user to scroll through the conversations related to the selected case 510 and determine which ones are displayed in the second set 520. In some embodiments, the first set 515 corresponds to the first five (5) conversations time-wise related to the selected case 510 and the second set 520 corresponds to the last five (5) conversations time-wise related to the selected case 510, in the example of FIG. 5. The entire list of conversations related to the selected case 510 may be viewed by scrolling through the conversations using navigations controls 525, 530, 535, and 540.

In some aspects, navigation of the first set 515 and the second set 520 are separate and independent of each other. In some aspects, one or more of the navigation controls may not be selectable when a navigation option is not available for use. For example, as depicted in FIG. 5 navigation control 525 is not available for selection since the first conversation (i.e., "Conv-1") in the list of the conversations related to case 510 is already displayed. Likewise, navigation control 540 is not available for selection since the last conversation (i.e., "Conv-38") in the list of the conversations related to case 510 is already displayed. Accordingly, navigation controls 525 and 540 may be disabled for selection, as indicated by the lighter representation of those controls.

Case details pane 505 also displays an icon indicative of the type or mode of communication used for each of the conversations presented therein, in accordance with some embodiments. The icons may represent any type or mode of communication, whether electronic (e.g., emails, text messages, telephonic, etc.) or a live face-to-face conversation or meeting. In the example of FIG. 5, icon 550 denotes a conversation conducted by telephone, icon 555 denotes a conversation conducted by video conference, and icon represents a conversation conducted by email. It is noted that fewer, more, or alternative icons may be used, if at all, to represent the type of communication used in conducting the displayed conversations.

As illustrated at 545, the conversations displayed in case details pane 505 may each optionally have a label or "tag" associated therewith. Where a conversation has a "PIN ME" representation at 545, no label is yet associated with that conversation. The conversation label or "tag" may be pinned to a conversation by a user. The label or tag 545 may be dynamically created by the user at the conversation level as the user interacts with the conversation explorer user interface. That is, labels need not be created previously (e.g., by a user interface designer) in order to be associated with a conversation. In some embodiments, a user may create labels or tags 545 ad-hoc "on-the-fly" as they interact with the user interface(s) herein. A user may create the label or tag 545 or be provided with a list of default or user-defined labels or tags from which to select for associating with a particular conversation. In the example of FIG. 5 two (2) labels are shown, a "REQ QT" (i.e., request quote) tag and a "CLOSED" (i.e., the conversation is closed from the user's point of view, with no further action required or anticipated) tag, although other or alternative labels or tags may be provided, as suited to a use, context, and preference. In some embodiments associating (i.e., "pinning") a label with a conversation/node may be a single step procedure, in contrast to a multi-step procedure where a label is first created and then associated with the conversation/node to pin it to the conversation/node. In some embodiments herein, the label creation and association with the node occurs simultaneously.

Figure 6:
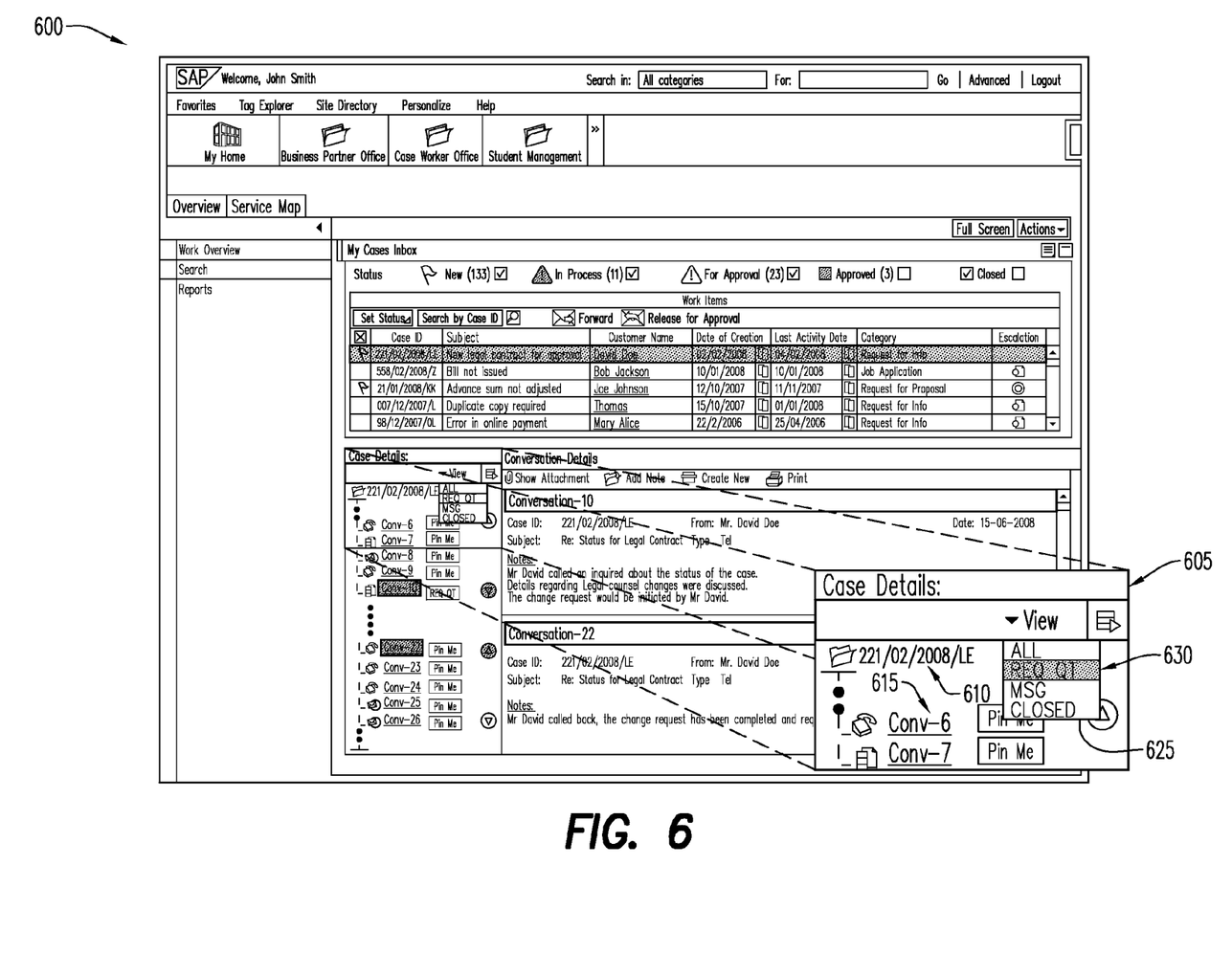
FIG. 6 illustrates a detailed view of a case details pane according to some embodiments.

In some embodiments, selection of "VIEW" button 565 may invoke a mechanism to filter the conversations displayed in case details pane 505 based on the labels or tags designated in a filter selection menu. FIG. 6 provides a detailed display of a case details pane 605 from a conversation explorer user interface 600. As illustrated, case details pane 605 includes a case ID 610 and a listing of conversations 615. Additionally, case details pane 605 shows that selection of the View button causes a drop-down View menu 625 to be displayed. View menu 625 includes a list of labels or tags that may be used for filtering the list of conversations displayed. For example, selecting "All" from View menu 625 will cause all of the conversations to be displayed, notwithstanding the label or tag associated with the conversations. Selecting one of the other tags (e.g., "REQ QT", "CLOSED", or "MSG" (i.e., a message that needs to be followed-up) will filter the list of conversations such that only those conversations associated with the selected label(s) or tag(s) will be presented in the case details pane 605. In some embodiments, one or more labels may be selected for filtering purposes via View menu 625. As illustrated in FIG. 6, "REQ QT" label 630 is selected such that only conversations having an associated "REQ QT" label or tag will be displayed in case details pane 605.

Figure 7:
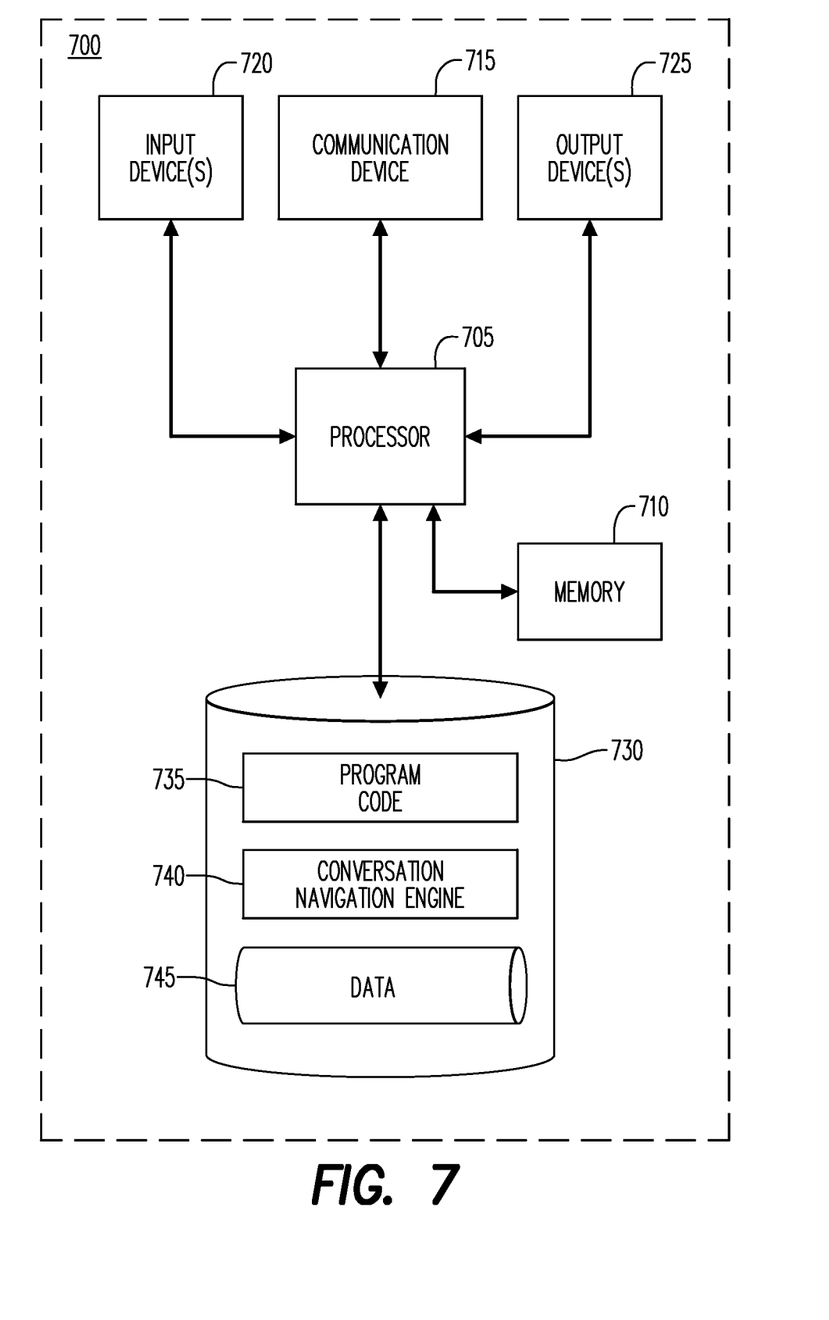
FIG. 7 is a block diagram of a system according to some embodiments.

FIG. 7 is a block diagram overview of a system or apparatus 700 according to some embodiments. System 700 may be, for example, associated with any of the devices described herein, including for example client 105 and business service provider 110. System 700 comprises a processor 705, such as one or more commercially available Central Processing Units (CPUs) in the form of one-chip microprocessors or a multi-core processor, coupled to a communication device 715 configured to communicate via a communication network (not shown in FIG. 7) to another device or system. In the instance system 700 comprises an application server, communication device 715 may provide a means for system 700 to interface with a client device (e.g., client 105). System 700 may also include a local memory 710, such as RAM memory modules. The system 700 further includes an input device 720 (e.g., a touch screen, mouse and/or keyboard to enter content) and an output device 725 (e.g., a computer monitor to display a user interface element).

Processor 705 communicates with a storage device 730. Storage device 730 may comprise any appropriate information storage device, including combinations of magnetic storage devices (e.g., a hard disk drive), optical storage devices, and/or semiconductor memory devices. In some embodiments, storage device may comprise a database system.

Storage device 730 stores a program code 735 that may provide computer executable instructions for processing requests from, for example, client devices in accordance with processes herein. Processor 705 may perform the instructions of the program 735 to thereby operate in accordance with any of the embodiments described herein. Program code 735 may be stored in a compressed, uncompiled and/or encrypted format. Program code 735 may furthermore include other program elements, such as an operating system, a database management system, and/or device drivers used by the processor 705 to interface with, for example, peripheral devices. Storage device 730 may also include data 740. Data 740 may be used by system 700, in some aspects, in performing the processes herein, such as process 400.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer-implemented method for presenting a plurality of conversations in a user interface, the method comprising:
   receiving a linked list of a plurality of related conversations, the related conversations each being associated with a common set of characteristics and each of the plurality of related conversations having its own associated conversation content details;
   presenting at least a portion of the linked list of the plurality of related conversations within a first display pane of a user interface, the related conversations included in the presented portion of the linked list being divided into a split listing comprising separate listings of multiple sets of the related conversations with each of the sets of the related conversations being separately and simultaneously presented in a grouping in the first display pane, where the presented portion of the linked list includes multiple conversations and each set includes a listing of at least two conversations and each of the sets of the related conversations are presented with navigation controls for selectively displaying specific conversations within each respective set of the related conversations; and
   presenting, in response to a selection of at least two different conversations included in the presented portion of the linked list of related conversations in the first display pane, conversation content details associated with each of the selected at least two different conversations, the presented conversation content details for the selected at least two conversations being presented in close proximity with each other in a second display pane within the user interface, simultaneously with the presented portion of the linked list of the plurality of related conversations in the first display pane of a user interface.

2. The method of claim 1, wherein two different conversations of the conversations included in the presented portion of the list are selected and, in response to the selection of the two different conversations, conversation content details associated with each of the selected two different conversations are presented in the user interface, the conversation details associated with each of the selected two different conversations being presented simultaneously with the presented portion of the linked list and each other and grouped together in the second display pane of the user interface, separate and apart from the presented portion of the list.

3. The method of claim 1, wherein the related conversations have an associated unique identifier to distinguish the plurality of conversations from each other.

4. The method of claim 1, wherein the plurality of the related conversations included in the presented portion of the list are presented in a predetermined order in accordance with a date/time value of each conversation.

5. The method of claim 1, wherein the presented portion of the linked list includes a grouping of a first set of sequentially ordered related conversations and a grouping of a second set of sequentially ordered different related conversations.

6. The method of claim 5, wherein the number of conversations in the first set of sequentially ordered related conversations and the second set of sequentially ordered different related conversations are based on at least one of a predetermined value or user-configurable value.

7. The method of claim 5, further comprising:
   receiving user input via the user interface to navigate among the related conversations in the grouping of the first set of sequentially ordered related conversations; and receiving user input via the user interface to navigate among the related conversations in the grouping of the second set of sequentially ordered related conversations, wherein navigation amongst the related conversations in the first and second sets of related conversations is independent of each other.

8. The method of claim 1, further comprising:
receiving an indication of a label identifier to associate with one or more specific conversations in the presented portion of the list; and
associating the received indication of the label identifier with the one or more specific conversations.

9. The method of claim 1, further comprising:
receiving an indication of a request for a specific one of the plurality of related conversations, wherein the specific one of the plurality of related conversations is one of the selected at least two different conversations.

10. The method of claim 1, wherein the common set of characteristics comprises at least one of a case, a task, a customer, a business process, an activity, an invoice, a purchase order, a business activity, and a business entity.

11. The method of claim 1, further comprising presenting an icon indicative of a type of communication used for each of the related conversations presented in the conversation details.

12. A service provider system, comprising:
a memory having program instructions stored thereon; and
a processor in communication with the memory, the processor being operative to:
receive a linked list of a plurality of related conversations, the related conversations being associated with a common set of characteristics and each of the plurality of related conversations having associated conversation content details;
present at least a portion of the linked list of the plurality of related conversations within a first display pane of a user interface, the related conversations included in the presented portion of the linked list being divided into a split listing comprising separate listings of multiple sets of the related conversations with each of the sets of the related conversations being separately and simultaneously presented in a grouping in the first display pane, where the presented portion of the linked list includes multiple conversations and each set includes a listing of at least two conversations and each of the sets of the related conversations are presented with navigation controls for selectively displaying specific conversations within each respective set of the related conversations; and
present, in response to a selection of at least two different conversations included in the presented portion of the linked list of related conversations in the first display pane, conversation content details associated with each of the selected at least two different conversations, the presented conversation content details of the selected at least two conversations being presented in close proximity with each other in a second display pane within the user interface, simultaneously with the presented portion of the linked list of the plurality of related conversations in the first display pane of a user interface.

13. The system of claim 12, wherein two different conversations of the conversations included in the presented portion of the list are selected and, in response to the selection of the two different conversations, conversation content details associated with each of the selected two different conversations are presented in the user interface, the conversation details associated with each of the selected two different conversations being presented simultaneously with the presented portion of the linked list and each other and grouped together in the second display pane of the user interface, separate and apart from the presented portion of the list.

14. The system of claim 12, wherein the related conversations have an associated unique identifier to distinguish the plurality of conversations from each other.

15. The system of claim 12, wherein the plurality of the related conversations included in the presented portion of the list are presented in a predetermined order in accordance with a date/time value of each conversation.

16. The system of claim 12, wherein the presented portion of the linked list includes a grouping of a first set of sequentially ordered related conversations and a grouping of a second set of sequentially ordered different related conversations.

17. The system of claim 16, wherein the number of conversations in the first set of sequentially ordered related conversations and the second set of sequentially ordered different related conversations are based on at least one of a predetermined value or user-configurable value.

18. The system of claim 16, further comprising:
receiving user input via the user interface to navigate among the related conversations in the grouping of the first set of sequentially ordered conversations; and
receiving user input via the user interface to navigate among the related conversations in the grouping of the second set of sequentially ordered related conversations, wherein navigation amongst the related conversations in each of the first and second sets of related conversations is independent of each other.

19. The system of claim 12, further comprising:
receiving an indication of a label identifier to associate with one or more specific conversations in the presented portion of the list; and
associating the received indication of the label identifier with the one or more specific conversations.

20. The system of claim 12, further comprising:
receiving an indication of a request for a specific one of the plurality of related conversations, wherein the specific one of the plurality of related conversations is one of the selected at least two different conversations.

21. The system of claim 12, wherein the common set of characteristics comprises at least one of a case, a task, a customer, a business process, an activity, an invoice, a purchase order, a business activity, and a business entity.

22. The system of claim 12, further comprising presenting an icon indicative of a type of communication used for each of the related conversations presented in the conversation details.

* * * * *